Sept. 16, 1924.  
E. T. BROWN  
1,508,378

GLASS GRINDING MACHINERY

Original Filed Feb. 16, 1920    3 Sheets-Sheet 1

WITNESS  
C. H. FRENCH

INVENTOR  
Edward T. Brown,  
BY J. K. Harness,  
ATTORNEY

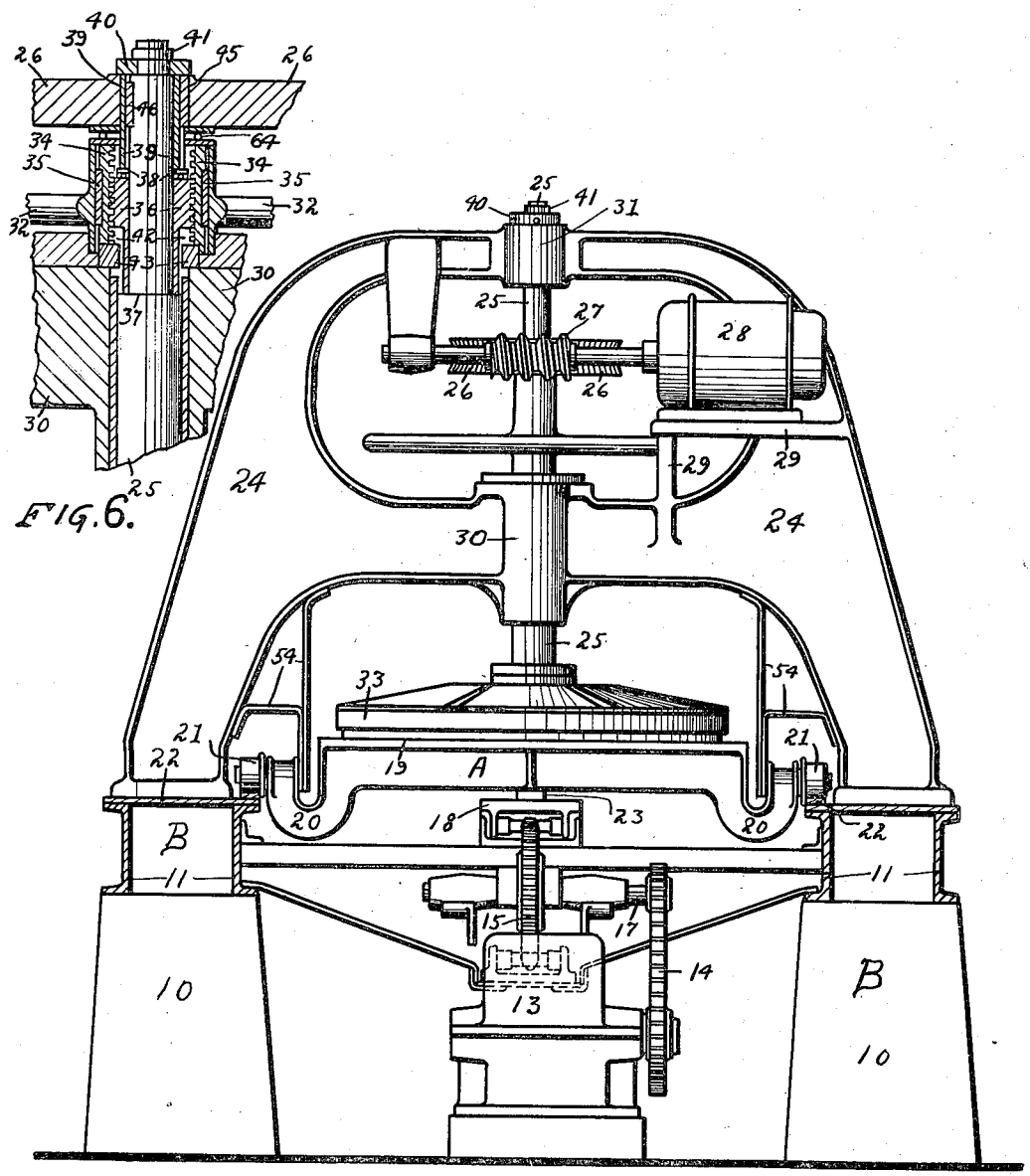

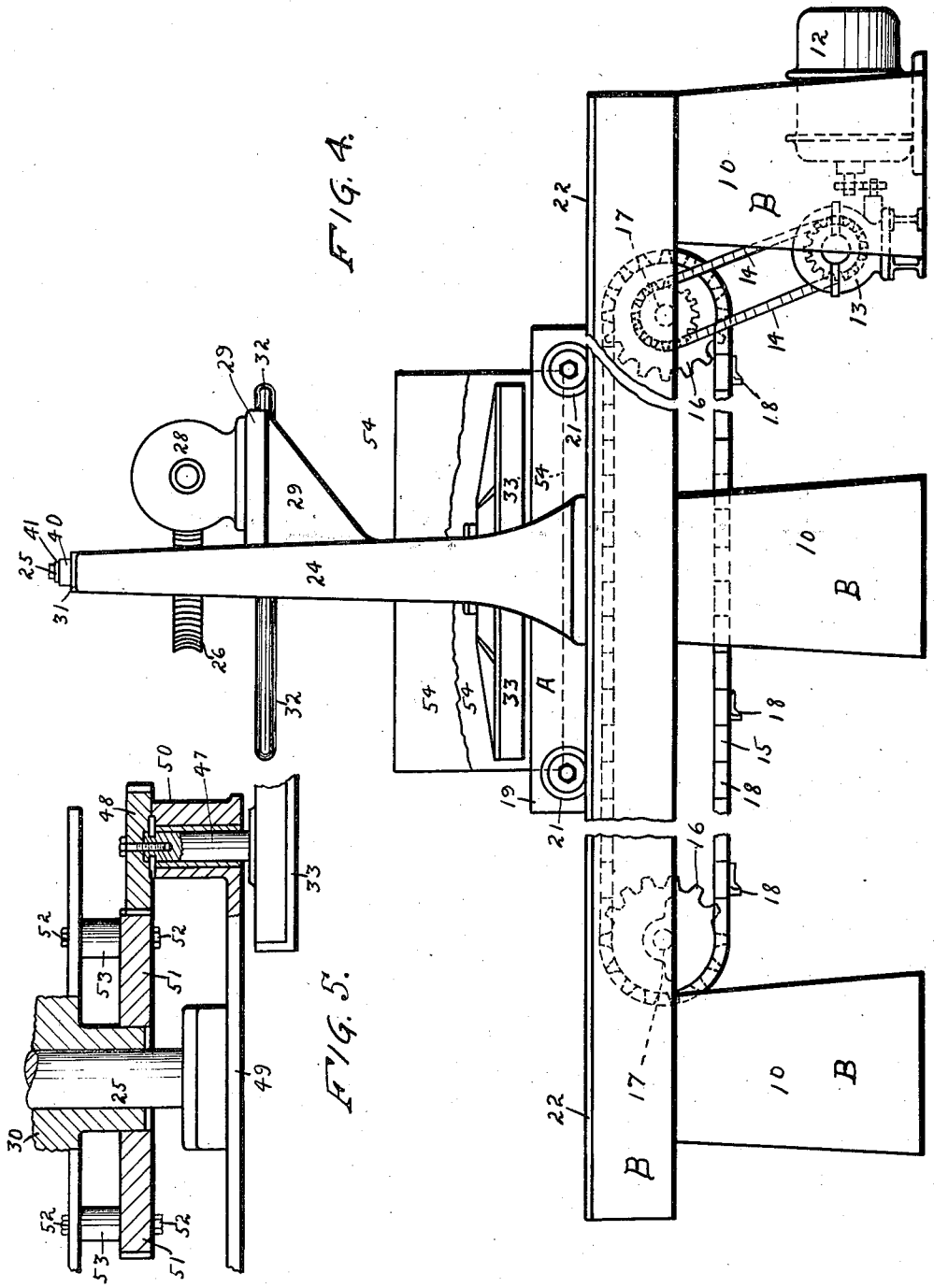

Patented Sept. 16, 1924.

1,508,378

UNITED STATES PATENT OFFICE.

EDWARD T. BROWN, OF DETROIT, MICHIGAN, ASSIGNOR TO FORD MOTOR COMPANY, OF DETROIT, MICHIGAN, A CORPORATION OF MICHIGAN.

GLASS-GRINDING MACHINERY.

Original application filed February 16, 1920, Serial No. 358,979. Divided and this application filed May 16, 1921. Serial No. 470,093.

*To all whom it may concern:*

Be it known that I, EDWARD T. BROWN, a citizen of the United States, residing at Detroit, in the county of Wayne and State of Michigan, have invented new and useful Improvements in Glass-Grinding Machinery, of which the following is a specification.

This application is a division of my application filed on February 16, 1920, Serial No. 358,979 for an improvement in glass manufacturing machinery.

The object of my invention is to provide new and useful glass grinding machinery of simple, durable and inexpensive construction.

A further object of my invention is to provide means whereby the process of grinding may be continuously pursued, comprising the combination of means for continuously producing sheets of glass of uniform quality and dimensions with means for grinding and finishing both sides of the pieces.

A further object of my invention is to provide improved means for mounting and conveying the sheets of glass beneath successive grinders, reversing the sheets, and grinding the second side.

A further object of my invention is to provide an improved grinder, consisting in the form shown of a grinding head having a plurality of grinding wheels mounted thereon to move in various directions at different speeds so that the various operations to smooth and polish the glass may be accomplished by a single type of head.

With these and other objects in view, my invention consists in the arrangement, combination, and construction of the various parts of my improved device, as described in the specification, claimed in my claims, and shown in the accompanying drawings, in which:

Figure 3 is an end elevation of one of my improved surface treating devices.

Figure 4 is a side elevation of the device shown in Figure 3.

Figure 5 is an enlarged, detailed view, parts being shown in section, which illustrates the construction of one form of my smoothing device, and Figure 6 is an enlarged, central, vertical section, detailed, of a portion of my improved surface treating device.

Figure 1:
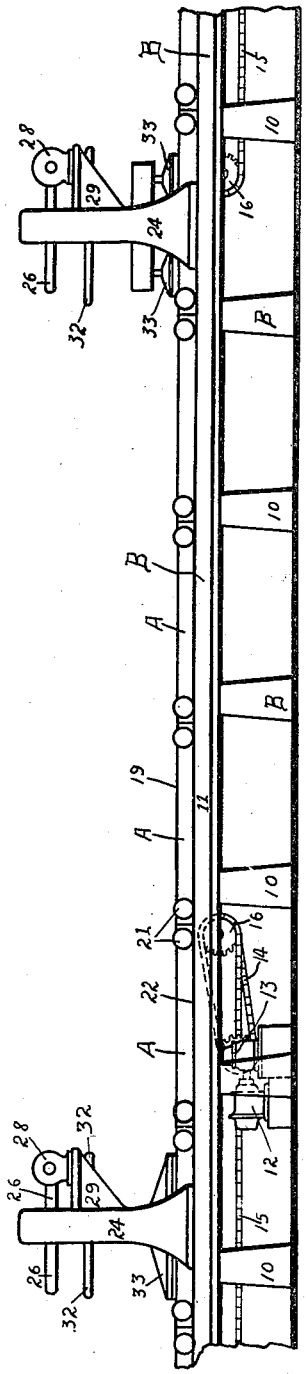
Figure 1 shows a side elevation of the conveyor and platform which carries the cut pieces of glass beneath the grinding and smoothing devices.
Figure 2:
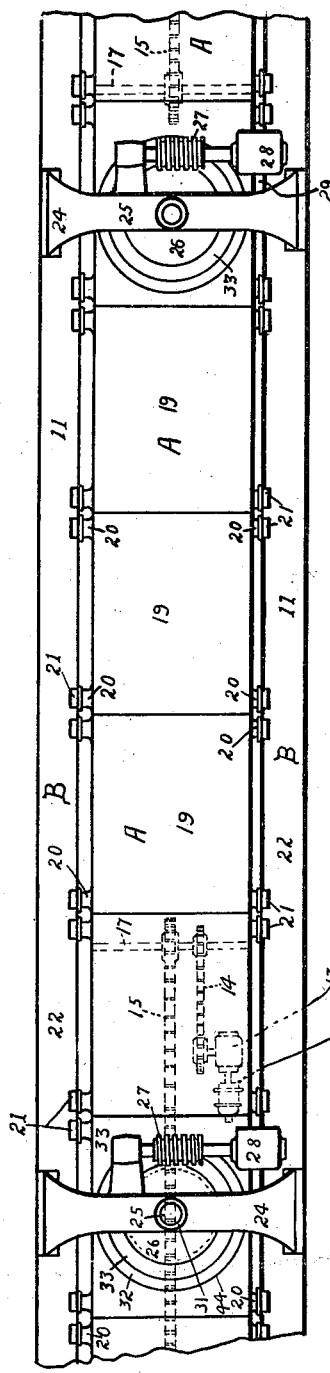
Figure 2 is a top or plan view of the device shown in Figure 1.

It will be understood that the glass sheets supplied to the grinding system here used are formed, as described in my co-pending application, of which this is a division—that is, the glass flowing from the tank is formed into a continuous strip by suitable rollers and then the strip is tempered and cut into pieces of a desired size. This system of grinding is, however, adapted for grinding, polishing and finishing pieces of glass cut to desired size and which have been formed by any system of glass manufacture.

When the glass sheet has been cut into pieces, one or more of the pieces are set in plaster upon the top of a cart or carrier, designated generally by the reference letter 'A'. It will be understood that the purpose of setting the glass on the plaster is so that its upper surface may be ground and that the weight of the grinders on the glass may not shatter it due to irregularities in the lower surface of the glass. After the glass is set as described, each cart or carrier A supporting the piece or pieces which it is designed to support, the carriers are placed on a platform, designated generally by the reference letter 'B', the carriers being positioned in end to end relation and advanced along the platform 'B' beneath rough-grinding devices and smooth-grinding devices. Enough rough grinding devices and smooth grinding devices are provided in conjunction with the platform 'B' so that the glass on each cart or carrier, 'A', as it passes along the platform, may be both rough-ground and smoothed ready for the polishing devices. I may also provide polishing devices in conjunction with the rough and smooth grinders so that the piece of glass need not be removed from the carrier 'A' until one side of the glass has been completely ground and polished.

As soon as the glass has been ground, or ground and polished, upon one side, the plaster in which it is set is softened in any suitable manner and the glass is then turned over and again set in plaster and then started along the same or a second platform 'B', which is not here illustrated as the construction thereof is similar in all respects to the platform 'B' here shown. I preferably provide suitable transfer means between the end of the platform 'B' which grinds the first side of the glass and the start of the platform 'B' which does the grinding of the second side of the glass, and in conjunction with such transfer means, preferably provide such mechanical aids as may be desirable to assist in the turning over of the glass and the re-setting thereof.

In connection with the grinding devices heretofore mentioned I have illustrated two forms thereof in the drawings, and the construction thereof will now be more particularly described, together with the construction of the platforms 'B'. The platforms 'B' comprise a plurality of spaced supporting legs 10, which in turn support longitudinal frame members 11. Between the legs 10 is disposed a motor 12, operatively connected through a worm gearing 13, and chain 14, to a drive conveyor 15, mounted on sprockets 16, said sprockets being fixed to shafts 17, which are suitably supported in position at the bottom of and between the frame members 11. The conveyor 15 comprises a chain having at intervals a plurality of outwardly extending lugs 18, spaced apart distances substantially equal to and which may represent the length or a fraction of the length of the carriers 'A'. The carriers 'A' comprise a platform 19, having at its four corners laterally extending curved arms 20, which are designed to form supports for rollers 21. The rollers 21, are flanged and run on a track 22, secured to the upper inner edge of the frame members 11. A lug or arm 23, projects downwardly from the platform 19 and is designed to co-act with the lugs 18 so that movement of the conveyor will impart a corresponding longitudinal movement to the carts or carriers 'A' along the platform 'B'. It will thus be seen that the conveyor 15, together with the carts or carriers 'A', form means for moving the pieces of cut and tempered glass continuously along the platform 'B', where they may come in contact with the grinding devices successively to eliminate irregularities in the surface of the glass. These grinding devices comprise yokes 24, which are mounted on the frame members 11, and extend across the platforms 'B' in position spaced above the path of travel of carriers 'A'.

These yokes carry a central, vertical shaft 25, driven by the worm wheel 26, which in turn operatively connects with a worm 27, driven by a motor 28, mounted on a suitable bracket 29, secured to the yoke 24. A comparatively large and heavy bearing 30 is provided in the central portion or web of the yoke 24, and a somewhat lighter bearing 31 is provided at the upper web of the yoke. A large wheel 32, is secured to the shaft 25, above the bearing 30, and acts as a positioning member to govern the relative vertical position of the shaft 25, if so desired. At the lower end of the shaft 25, is a grinding device which may be either of the form illustrated in Figures, 3, 4 and 6, or of the form illustrated in Figure 5. In either case the grinding is performed by rotating a cast iron disk 33, which is connected with the shaft 25, in such position that the lower surface of the disk 33 contacts with the upper surface of the glass on the carrier 'A', so that when sand and water is introduced between the glass and the disk, the rotation of the disk causes an abrading action on the surface of the glass to thereby eliminate the irregularities thereof.

I have found it desirable to make the grinding disk vertically adjustable and have, in Fig. 6, illustrated one form of device for accomplishing that result. In this form of device the large wheel 32 has a sleeve 34 positioned internal of and keyed to the inner surface of the hub at 35. The interior of the sleeve 34 is threaded to co-act with a similarly threaded sleeve 36, which is rotatably mounted on the shaft 25. The shaft 25 is provided with a shoulder 37 below the sleeve 36, and which co-acts therewith to hold the sleeve in place. Above the sleeve 36 is a thrust bearing 38, which extends through worm wheel 26 and contacts with a sleeve 39, which in turn supports a split ring 40, fixed to the shaft 25, below an annular flange 41, on the shaft. From the construction of the parts just described it will be seen that rotation of the wheel 32 will impart rotation to the sleeve 34, which in turn co-acts with the sleeve 36, which will cause the sleeve 36 to be raised or lowered, depending upon the direction of rotation of the wheel 32. The sleeve 36 is held from rotation within the bearing 30 by means of a key-way 42, which, however, permits the sleeve to reciprocate vertically. Vertical reciprocation of the sleeve 36 moves the shaft 25 downwardly or upwardly, due to the shoulder 37 or due to the sleeve 39 and collar 41. The hub of the wheel 32 is countersunk into a collar 43, mounted above the bearing 30, and above the hub is a thrust bearing 64 upon which the worm gear 26 rests. The worm gear 26 is slidably keyed to the sleeve 39 at 45, and the sleeve 39 is in turn slidably keyed to the shaft 25 at 46. It will, therefore, be seen that vertical reciprocation to adjust the shaft 25 and sleeve 39 will not affect the vertical position of the worm wheel 26.

In the form of device illustrated in Figures 3 and 4, the disk 33 consists of a single, large disk of slightly greater diameter than the width of the piece of glass to be ground. In the form of device illustrated in Figure 5, a plurality of smaller disks are driven by means of a planetary transmission, which will now be described. These disks 33 are each secured to a shaft 47, which has at its upper end a gear wheel 48. A plate or disk 49 is secured to the lower end of the shaft 25, and has a plurality of spaced, vertical bearings 50, disposed at intervals around near its outer edge. The shaft 47 is received in the bearing 50 so that rotation of the shaft 25 imparts rotation to the disk 49 and in turn carries shafts 47 and disks 33 around through a circular path. A large ring gear 51 is secured to the transverse web of the yoke 24 adjacent to the bearing 30 by means of bolts 52 and collars 53. The collars 53 act as spacing sleeves to position the ring gear 51 in horizontal alignment with the gear wheels 48. Due to the mounting of the ring gear 51 it will be seen rotation or travel of the disks 33 in a circular path will cause the engagement of the gear wheels 48 with the ring gear 51 to rotate the disks 33 during their circular travel.

In this form of the device sand and water is introduced between the grinding disks 33 and the glass in the same way in which it is used where a single, large disk 33 is used.

I do not desire to limit myself to cast iron grinding disks in combination with sand and water for grinding, but may find it desirable to use disks of abrasive material.

Adjacent to each of the yokes 24 I provide a shield 54 which is secured to the yoke 24, and adapted to prevent the sand and water from the grinding disk being thrown on to the tracks, etc., during the rotation of the disk. In this connection it may also be mentioned that I have found the large, single disks desirable to use for the rough grinding of the glass and the plurality of smaller disks driven by the planetary transmission more desirable for the finish or smooth grinding.

The present invention is of such type as to be particularly adapted for use in a general system of sheet glass production in which glass sheets are formed, annealed and then cut to grinding and polishing size, being brought into the zone of activity of the present invention. The production of the glass sheet is not specifically claimed herein, but in the system referred to, which is in actual operation, the production is along the following lines:

Glass is flowed from a spout onto a conveyor, then between a conveyor and roller, whereby the molten glass is reduced to a predetermined width and thickness. This molten glass is then carried by the further movement of the conveyor to position where it has hardened somewhat so that it may be delivered to the slab 19 of the leer. It is pulled through the leer by drawing conveyors, carried through an unheated chamber until sufficiently cooled to be exposed to the atmosphere, and then carried on a conveyor a distance sufficient so that the strip of glass may be trimmed and cut to pieces of a desired size. These pieces are then taken off the last mentioned conveyor when cut and slid onto the moist plaster on a carrier 'A', then the carrier 'A' is rolled onto the tracks 22 of the platforms 'B'. The platform 'B' may be a continuation of the conveyor on which the glass is cut, and it will be understood that I may use the endless type of conveyor and provide an automatic plaster mixer, so that the pieces of glass may be slid from the cutting conveyor to the platform 'B' without stopping its progress. It will thus be seen that the process of the manufacture of the glass, including the grinding, may be a continuous process, provided the proper number of workmen are provided for mounting the pieces of glass on the carriers 'A'. After the one side of the glass has been ground, it is loosened from the carrier, turned over, and remounted in plaster. There again the process of turning the glass may be speeded up by providing a sufficient number of workmen and carriers so that it may be ground on the reverse side just as rapidly as on the first side. The grinding process, either on the first side or second side, may be carried on as rapidly as the cutting conveyor may turn out the pieces of glass by increasing the number of grinding devices used or operated on the two platforms 'B'. It may, therefore, be said that by my improved method and machinery for making glass I have devised a system whereby glass in plates may be turned out as rapidly at the end of the grinding process as the glass can be formed from a tank.

The advantage of such a continuous system of grinding glass will be obvious, both because of the low overhead expense involved therein due to the continuous use of all the machinery, and because of the improved quality of the glass due to its continuous production under constant conditions. In this connection it may be mentioned that the quality of glass depends upon so many different elements that it is almost impossible to secure glass of uniform quality because so many conditions must be made uniform under ordinary circumstances. With my improved arrangement, however, it will be seen that the apparatus used will require but very slight attention to keep all the conditions of manufacture uniform throughout the time that the devices are being operated so that the glass turned out will be uniformly of good quality.

Some changes may be made in the arrangement and construction of the various parts of my improved device without departing from the spirit of the invention therein and it is my intention to cover by my claims such changes as may be reasonably included within the scope thereof.

I claim as my invention:

1. In the art of surfacing glass, and wherein the glass sheet is moved in a definite horizontal path beneath a fixedly-positioned instrumentality; a carrier for the glass-sheet and tracks on and between which it moves; a frame supported outside the tracks and extending over the carrier travel path; a surfacing unit mounted in the frame within spaced-apart upper and lower bearings, said unit including a surfacing element operating within the space below the lower bearing, and a shaft for rotating the surfacing element with the shaft mounted in the bearings; means for rotating the shaft and including a motor supported on the frame and having operating connections with the shaft within the space between said bearings; and unit-supporting and surfacing element positioning means operative to produce controllable gravity-pressure of the surfacing element on the sheet, said latter means including a rotatable adjusting element concentric with the shaft and positioned between the motor-operating connections and the lower bearing 2. A combination as in claim 1 characterized in that the operating connections between the motor and shaft include a worm and gear assembly, with the gear having a splined relation to the shaft to permit relative axial movement between shaft and gear.

3. In the art of surfacing glass, and wherein the glass sheet is moved in a definite horizontal path beneath a succession of fixedly-positioned surface-producing instrumentalities individually active upon the passing sheet with the activity of one instrumentality made manifest upon the surface produced during activity of the preceding instrumentality, a carrier for the glass-sheet and tracks on and between which it moves; an individual frame for each instrumentality with each frame supported outside the tracks and extending over the carrier travel path; a surfacing unit for and mounted in each frame, said unit including a surfacing element, and a shaft for rotating the element with the shaft mounted in bearings on the frame; means, individual to the instrumentality for rotating the unit shaft of the instrumentality, said means including an electric motor supported on the frame and operatively connected to the shaft by a worm and gear connection; and unit-supporting and element-positioning means for and individual to each instrumentality and operative to produce controllable gravity-pressure of the individual elements on the sheet, whereby surface treatment activity at individual instrumentality stations can be controlled both by gravity-pressure and by speed of rotation of the formation.

4. A combination as in claim 3, characterized in that the unit-supporting and element positioning means of each instrumentality includes a rotatable adjusting element operatively connected with the shaft and positioned between the worm and gear connections and the rotating surfacing element of the unit.

5. In the art of surfacing glass sheets, and wherein the supported sheet is moved relative to a surface-producing instrumentality, means for supporting such instrumentality to permit a controllable gravity-pressure application of the surface-producing formation upon the travelling sheet, said means including a supporting frame structure above the plane of sheet movement; a rotatable unit carried by said frame and including a surfacing element and a vertical shaft operatively connected to the element and mounted in spaced-apart upper and lower bearings of the frame; driving means operative on the shaft within the space between the bearings; and mechanism active within such space for supporting said shaft to permit controllable gravity positioning of the unit at will, said mechanism including a member supported by the frame adjacent the lower bearing and rotatable at will, a non-rotatable device concentric with and supported by the shaft, said member and device having a threaded connection, and means on the shaft above the non-rotatable device and in operative relation to such device to place the weight of the unit upon said formation and said member, whereby rotation of the member will act to adjust the position of the unit while permitting unit yielding in presence of resistance of superior value to the unit weight.

EDWARD T. BROWN.

Witness:
E. L. DAVIS.